United States Patent
Aalto et al.

(10) Patent No.: US 8,295,813 B2
(45) Date of Patent: Oct. 23, 2012

(54) FULL REDUNDANT SERVICE REGISTER IN THE MULTI-VENDOR NETWORK

(75) Inventors: Petri Aalto, Pirkkala (FI); Seppo Honkanen, Helsinki (FI); Harri Kukkasniemi, Orivesi (FI)

(73) Assignee: Nokia Siemens Networks Oy, Espoo (FI)

( * ) Notice: Subject to any disclaimer, the term of this patent is extended or adjusted under 35 U.S.C. 154(b) by 2022 days.

(21) Appl. No.: 11/151,424

(22) Filed: Jun. 14, 2005

(65) Prior Publication Data
US 2006/0015506 A1    Jan. 19, 2006

Related U.S. Application Data
(60) Provisional application No. 60/578,878, filed on Jun. 14, 2004.

(51) Int. Cl.
*H04L 12/58* (2006.01)
(52) U.S. Cl. .................................. 455/412.1
(58) Field of Classification Search ................ 455/425, 455/433, 453; 370/328, 338
See application file for complete search history.

(56) References Cited

U.S. PATENT DOCUMENTS

| | | | | | |
|---|---|---|---|---|---|
| 5,594,942 | A | * | 1/1997 | Antic et al. | 455/423 |
| 5,953,662 | A | * | 9/1999 | Lindquist et al. | 455/433 |
| 6,151,499 | A | * | 11/2000 | Vudali et al. | 455/433 |
| 6,408,182 | B1 | * | 6/2002 | Davidson et al. | 455/433 |

FOREIGN PATENT DOCUMENTS
EP    0 959 637    11/1989

OTHER PUBLICATIONS
Official Communication issued in the corresponding Chinese Application No. 200580025469, dated Jun. 20, 2008.

* cited by examiner

*Primary Examiner* — Michael Faragalla
(74) *Attorney, Agent, or Firm* — Squire Sanders (US) LLP

(57) ABSTRACT

A communication system includes a plurality of first entities. Each of the plurality of first entities includes at least one database. The system also includes at least one second entity being dedicated to at least one of the plurality of first entities. The at least one second entity includes data from databases associated with the plurality of first entities. The system further includes a third entity for determining when one of the plurality of first entities malfunctions and for selecting another one of the plurality of first entities as a redundant entity. The at least one second entity is associated with the redundant entity and data is retrieved from the at least one second entity to process incoming requests to the redundant entity.

18 Claims, 3 Drawing Sheets

FULL REDUNDANT SERVICE REGISTER IN THE MULTI-VENDOR NETWORK

REFERENCE TO RELATED APPLICATIONS

This application claims priority of U.S. Provisional Patent Applications Ser. No. 60/578,878, filed on Jun. 14, 2004. The subject matter of the earlier filed application is hereby incorporated by reference.

BACKGROUND OF THE INVENTION

1. Field of the Invention

The present invention relates to mobile communications systems and more particularly to a mobile communications system which includes a redundant register network for automatically controlling and supervising units in a switching system.

2. Description of the Related Art

Mobile communications systems include a switching unit which is responsible for performing call processing and subscriber related functions. The switching unit includes various units for storing and processing subscriber information. For example, the switching unit includes a Home Location Register (HLR) which is a database for storage and management of subscriptions. The HRL stores permanent data for subscribers, including a service profile, location information and activity status for each subscriber. Specifically, HLR subscriber information includes a International Mobile Subscriber Identity (IMSI), service subscription information, location information which includes the identity of a currently serving Visitor Location Register (VLR) to enable routing of mobile-terminated calls, service restrictions and supplementary services information. In addition to the HRL, the switching system includes an authentication center (AUC) which is a unit that provides authentication and encryption parameters that verify the user's identity and ensure the confidentiality of each call. The switching system also includes an equipment identity register (EIR) which is a database that includes information about the identity of mobile equipment to prevent calls from stolen, unauthorized or defective mobile stations.

Traditional communications network design is based on the utilization of a single Home Location Register (HLR) for each network. However, growth considerations and the creation of multi-vendor networks have prompted carriers to implement multiple HLR topologies. During operation of the communication system, the HLR, AUC, and/or EIR may become dysfunctional. When the one of these units goes out of order, current communications systems cannot automatically detect the out-of order status. As such, there is no way to automatically control and supervise HLRs AUCs and/or EIRs in a multi-vendor redundancy solution.

SUMMARY OF THE INVENTION

According to one embodiment of the invention, a communication system includes a plurality of first entities. Each of the plurality of first entities includes at least one database. The system also includes at least one second entity being dedicated to at least one of the plurality of first entities. The at least one second entity includes data from databases associated with the plurality of first entities. The system further includes a third entity for determining when one of the plurality of first entities malfunctions and for selecting another one of the plurality of first entities as a redundant entity. The at least one second entity is associated with the redundant entity and data is retrieved from the at least one second entity to process incoming requests to the redundant entity.

Additionally, the third entity may be configured to supervise and control the plurality of first entities by sending a predetermined message to at least one unit in each of the plurality of first entities. The third entity may be configured to determine a malfunctioning one of the plurality of first entities when the malfunctioning one does not respond to the predetermined message. Furthermore, the redundant entity may be configured as an empty entity, each of plurality of first entities may be configured to communicate with at least one subscriber entity and the system may include a database interface for communications with at least one external database.

Additionally, the third entity may be configured to perform load sharing among the plurality of first entities when one of the plurality of first entities malfunctions. The third entity may be configured to create test subscribers in each of the plurality of first entities. The third entity uses the test subscriber to determine which of the plurality of first entity is a malfunctioning entity. The third entity may also be configured to divide the test subscribers among the plurality for first entities in a round robin fashion. The third entity may also automatically create a test subscriber in one of the plurality for first entities when the third entity determines that the test subscriber is missing from the one of the plurality of first entities.

According to another embodiment of the invention, a method for selecting a redundant entity includes the step of creating at least one second entity being dedicated to at least one of a plurality of first entities. The at least one second entity comprising data from databases associated with the plurality of first entities. The method also includes the steps of determining when one of the plurality of first entities malfunctions and selecting another one of the plurality of first entities as a redundant entity, wherein the at least one second entity is associated with the redundant entity. The method further includes the step of retrieving data from the at least one second entity to process incoming requests to the redundant entity.

Additionally, the step of determining when one of the plurality of first entities malfunctions further includes the steps of supervising and controlling the plurality of first entities by sending a predetermined message to at least one unit in each of the plurality of first entities and determining a malfunctioning one of the plurality of first entities when the malfunctioning one does not respond to the predetermined message. The method may also include the step of enabling each of plurality of first entities to communicate with at least one subscriber entity.

Additionally, the step of selecting may further include the step of performing load sharing among the plurality of first entities when one of the plurality of first entities malfunctions. Prior to the step of determining when one of the plurality of first entities malfunctions, the method further includes the step of creating test subscribers in each of the plurality of first entities. The test subscribers are used to determine which of the plurality of first entity is a malfunctioning entity. The may also include dividing the test subscribers among the plurality for first entities in a round robin fashion and automatically creating a test subscriber in one of the plurality for first entities when a determination is made that the test subscriber is missing from the one of the plurality of first entities.

According to another embodiment of the invention, an apparatus for selecting a redundant entity includes creating means for creating at least one second entity being dedicated to at least one of a plurality of first entities. The at least one second entity includes data from databases associated with the plurality of first entities. The apparatus also includes determining means for determining when one of the plurality of first entities malfunctions and selecting means for selecting another one of the plurality of first entities as a redundant entity. The at least one second entity is associated with the redundant entity. The apparatus also includes retrieving means for retrieving data from the at least one second entity to process incoming requests to the redundant entity.

BRIEF DESCRIPTION OF THE DRAWINGS

For proper understanding of the invention, reference should be made to the accompanying drawings, wherein.

DETAILED DESCRIPTION OF PREFERRED EMBODIMENTS

Reference will now be made to the preferred embodiments of the present invention, examples of which are illustrated in the accompanying drawings.

Figure 1:
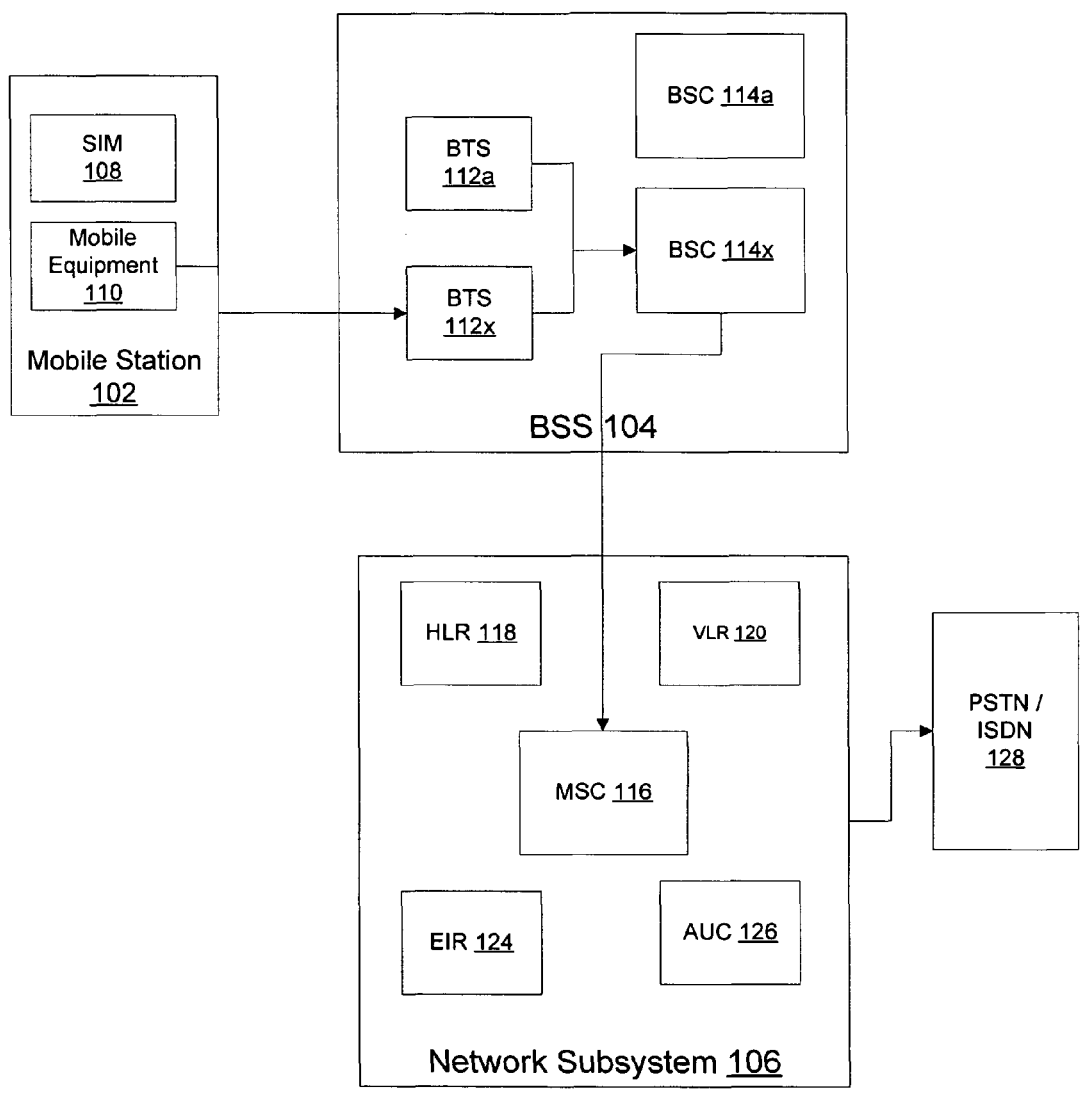
FIG. 1 illustrates a communications network in which the present invention may be implemented.

FIG. 1 illustrates a communications network in which the present invention may be implemented. The communications network of FIG. 1, for example a GSM network, includes a mobile station (MS) 102, a base station subsystem (BSS) 104 and a network subsystem 106. MS 102 is carried by a subscriber. BSS 104 controls the radio link with MS 102 and network subsystem 106 performs the switching of calls between the mobile users and between mobile and fixed network users.

MS 102 includes a mobile equipment/terminal 110 and a Subscriber Identity Module (SIM) 108. SIM 108 provides personal mobility, so that the user can have access to subscribed services irrespective of a specific terminal. Mobile equipment 110 is uniquely identified by an International Mobile Equipment Identity (IMEI). SIM 108 includes an International Mobile Subscriber Identity (IMSI) which is used to identify the subscriber to the system, a secret key for authentication, and other information. The IMEI and the IMSI are independent, thereby allowing personal mobility. SIM 108 may be protected against unauthorized use by a password or personal identity number.

BSS 104 includes Base Transceiver Stations (BTS) 112a-112x and Base Station Controllers (BSC) 114a-114x. Each BTS 112 houses radio transceivers that define a cell and handles the radio-link protocols with MS 102. Each BSC 114 manages the radio resources for one or more BTS 112 and handles radio-channel setup, frequency hopping, and handovers.

Network Subsystem 106 includes a Mobile services Switching Center (MSC) 116 which acts like a normal switching node of a Public Switched Telephone Network (PSTN) or ISDN 108. MSC 116 additionally provides, in conjunction with several functional entities of network subsystem 106, all the functionality needed to handle a mobile subscriber, such as registration, authentication, location updating, handovers, and call routing to a roaming subscriber. MSC 116 provides connection to fixed networks such as the PSTN or ISDN. Signaling between functional entities in Network Subsystem 106 uses Signaling System Number 7 (SS7). Specifically, a Home Location Register (HLR) 118 and a Visitor Location Register (VLR) 120, together with the MSC 116, provide the call-routing and roaming capabilities of the network. HLR 118 includes all the administrative information of each subscriber registered in the corresponding network, along with the current location of mobile station 102. VLR 120 includes selected administrative information, from HLR 118, necessary for call control and provisioning of the subscribed services for each mobile station currently located in a geographical area controlled by VLR 120.

Network Subsystem 106 further includes a Equipment Identity Register (EIR) 124 which is a database that includes a list of all valid mobile equipment 110 on the network, where each MS 102 is identified by its IMEI. Network Subsystem 106 also includes an Authentication Center (AuC) 126 which is a protected database that stores a copy of a secret key stored in each subscriber's SIM 108. The secret key is used for authentication and encryption over the radio channel.

When a mobile subscriber roams into a new location, VLR 120 associated with the new location automatically determines that it must update HLR 118 with the new location information, which it does using an SS7 Location Update Request Message. The Location Update Message is routed to HLR 118 through the SS7 network. HLR 118 responds with a message that informs VLR 120 whether the subscriber should be provided service in the new location.

Figure 2:
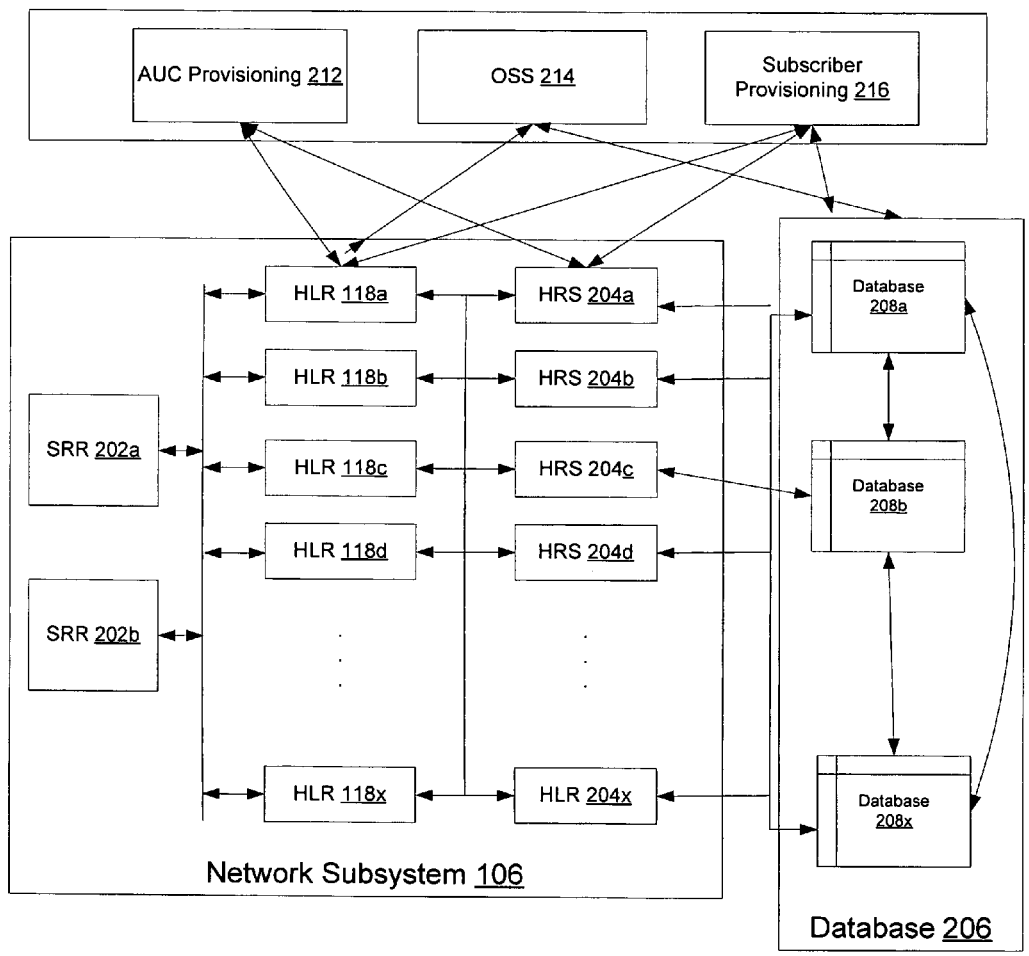
FIG. 2 illustrates a subsystem which includes multiple HLRs.

In current networks, it has become necessary to add more HLRs 118 to the network. This requirement might be prompted by a service subscription record storage capacity issue, or perhaps an SS7 message processing performance issue. It might possibly be prompted by a need to increase the overall network reliability. However, during operation of network 100, any of HLR 118, AUC 126 and/or EIR 124 may go out of order. FIG. 2 illustrates a subsystem 210 which includes multiple HLRs. According to FIG. 2, subsystem 210 also includes two Service Routing Registers (SRR) 202a and 202b. In current networks, however, the SRR does not have load sharing and observation capabilities over the HLRs. Thus, if one HLR goes down, the other active HLRs cannot take over the traffic of the defunct HLR without the risk of being overloaded.

In at least network embodiment of the present invention, each of SRR 202a and 202b has load sharing and observation capabilities over all registers, such as HLRs 118, AUC 126 and/or EIR 124. According to one embodiment of the invention, each of SRR 202 includes a process which controls testing and performs analyses on the condition of the registers or HLRs 118. Thus, if one HLR 118 is not functioning properly, another HLR can take over the traffic of the defunct HLR. It should be noted that while the discussion below is directed to the HLR, the inventive system may be used to handle redundancy issue related to other registers, such as AUC 126 and/or EIR 124.

In one embodiment of the invention, one of the HLRs 118, for example HLR 118d, is an empty HLR entity and is used for redundancy. Each of HLR 118 has a corresponding HLR redundancy server (HRS) 204a-204x. HRS 204d which corresponds to HLR 118d includes a register of all the subscribers of all HLRs 118. HLR 118 is in communications with one or more units, for example, an AUC provisioning unit 212, an OSS unit 214 and a subscriber provisioning unit 216. Subsystem 106 is connected to a database 206 so that the system can be provisioned from the database. According to an embodiment of the invention, database 206 may include multiple SQL databases 208a-208x such that databases 208 work as a realtime work station of network 100. Each of HRS 204 includes an ODBC interface for working with databases 208. It should be apparent to one of ordinary skill in the art that a common SQL database can be used in place of databases 208 for common provisioning from one source.

In one embodiment of the inventive system, when one of HLR 118, AUC 126 and/or EIR 124 goes to out of order, the out-of-order status is automatically observed and a new unit is selected in its place. Specifically, SRR 202 controls all registers in network subsystem 106 by sending a heart beat to each register and/or every database unit in the register. If there is a problem with a register, the register will not reply to the heart beat message from SRR 202. SRR 202 then performs an analysis of the available working registers to select a new register to replace the malfunction register. So for example, when one of HLR 118 goes out of order, SRR 202 automatically detects the malfunction and enables network 100 to select a replacement HLR 118d, i.e. the empty HRL entity, from one of the functioning HLRs. According to an embodiment of the invention, SRR 202 controls all HLRs 118 by sending heart beat messages to each HLR 118 in a predefined time interval. SRR 202 sends a RestoreData message to every HLR 118 and to every database unit in each HLR 118. If there is a problem with one of the HLRs 118, for example HLR 118a, HLR 118a will not reply to the heart beat message from SRR 202.

According to an embodiment of the invention, there are test subscribers in each HLR 118 and/or every HLR database unit. The test subscribers are created with the assistance of subscriber entities 212 and 216 of FIG. 2 and OSS 214. The test subscribers are regularly polled by SRR 202 with the RestoreData message. When all RestoreData operations related to a specific test subscriber fail, SRR 202 knows in which HLR unit the unsuccessfully polled subscriber resides and concludes that this HLR unit is unreachable. This causes SRR 202 to internally analyze the available working registers and to forward calls related to an HLR deemed non-functioning, for example HLR 118a, to a redundant HLR, for example HLR 118d. By choosing empty HLR 118d as the replacement HLR, the invention ensures that the redundant HLR can process the traffic for the dysfunctional HLR without the risk of being overloaded. It should be apparent to one of ordinary skill in the art, that the SRR 202 may select a non empty HLR as the redundant HLR and still maintain the benefits of the inventive system. SRR 202 then reroutes all subsequent service requests associated with the dysfunctional HLR 118a to redundant HLR 118d. Redundant HLR 118d retrieves the subscriber information for the new service requests from its associated HRS 204d.

The present invention therefore provides fast detection and recovery of HLR failure. The present invention also provides automated switchover to redundant HLR 118d. Furthermore, the present invention overcomes load sharing issues between HLRs due to failures in a multi-vendor environment.

In one embodiment of the invention, there may be several HLR units in a single HLR, for example in HLR 118a. In this embodiment, there may be a threshold value configured in SRR 202 for determining the minimum number of HLR units that are required to be found simultaneously dysfunctional in order for SRR 202 to route subsequent service request associated with the determined dyfunctional HLR to the redundant HLR.

In the inventive system, SRR 202 polls test subscribers every HLR 118 with a RestoreData MAP operation over SS7 as a heart beat message. If SRR 202 observes that one of HLR 118 does not respond, SRR 202 reroutes all subsequent service request associated with the defunct HLR to the redundant HLR. After the switch over to the redundant HLR, if a non-test subscriber's information is missing from the redundant HLR, the subscriber information is automatically created from one of HRS 204 or SQL database 208. In an embodiment of the invention, SRR 202 may reroute all subscribers which belong to a broken HLR to other working HLRs. The inventive system therefore ensures that there is a full automatic redundant control for service registers, for example, HLR 118, AUC 126 and EIR 124.

Figure 3:
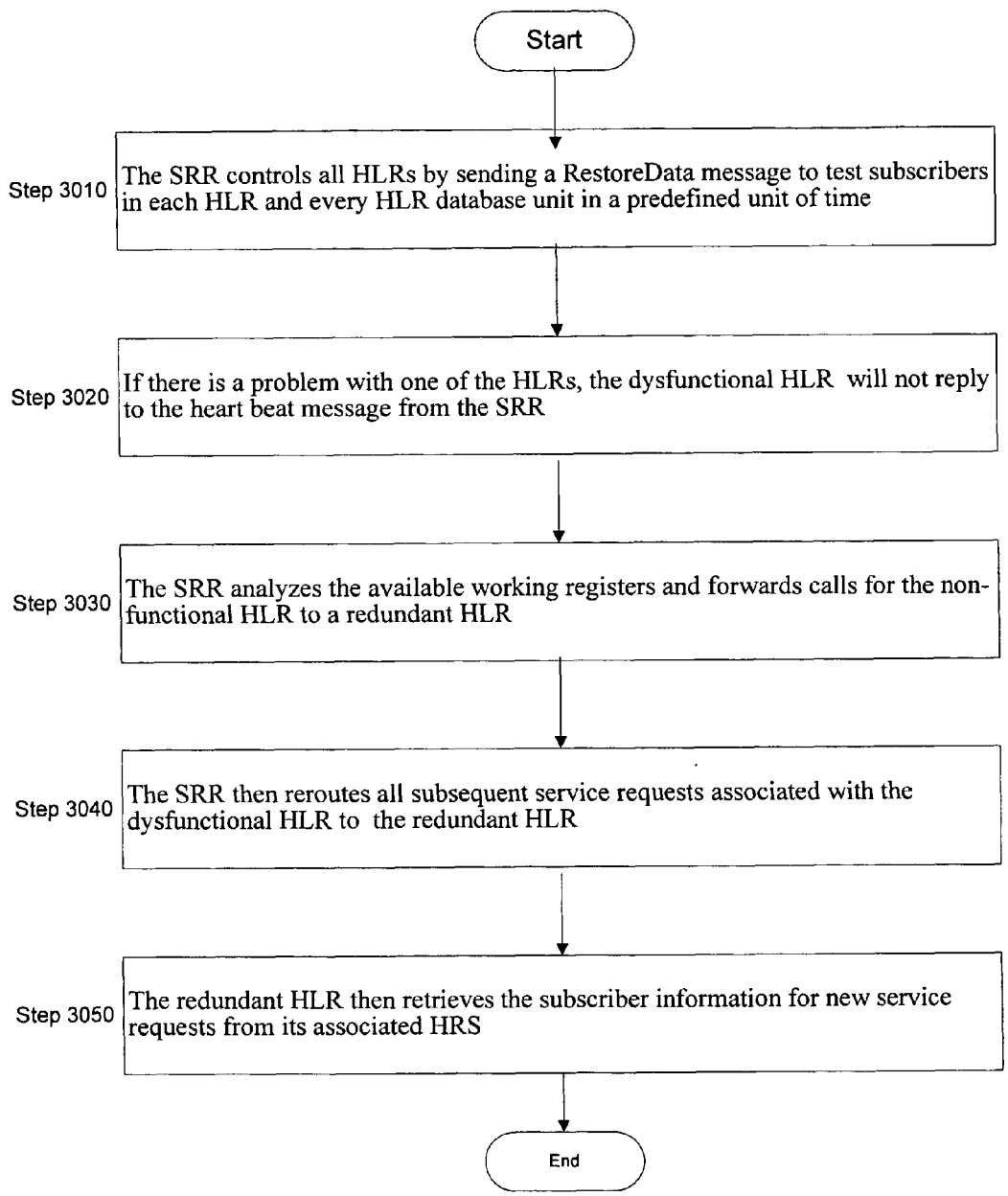
FIG. 3 illustrates the steps implemented in a multi-vendor system which provides a full redundant register network.

FIG. 3 illustrates the steps implemented in an embodiment of the inventive system. In Step 3010, SRR 202 controls all HLRs 118 by sending a RestoreData message to test subscribers in each HLR 118 and every HLR database unit in a predefined time interval. In Step 3020, if there is a problem with one of the HLRs 118, the dysfunctional HLR 118 will not reply to the heart beat message from SRR 202. In Step 3030, SRR 202 internally analyzes the available working registers and forwards calls for the non-functioning HLR 118 to a redundant HLR. In Step 3040, SRR 202 then reroutes all subsequent service requests associated with the dysfunctional HLR 118 to the redundant HLR 118. In Step 3050, the redundant HLR 118 retrieves the subscriber information for new service requests from its associated HRS 204.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A communication system comprising:
a plurality of registers, each of the plurality of registers comprising at least one database;
at least one register redundancy server being dedicated to at least one of the plurality of registers, the at least one register redundancy server comprising data from databases associated with the plurality of registers; and
a service routing register configured to determine when one of the plurality of registers malfunctions and to select another one of the plurality of registers as a redundant entity, wherein the at least one register redundancy server is associated with the redundant entity and data is retrieved from the at least one register redundancy server to process incoming requests to the redundant entity.

2. The system according to claim 1, wherein the service routing register is configured to supervise and control the plurality of registers by sending a predetermined message to at least one unit in each of the plurality of registers, wherein the service routing register is configured to determine a malfunctioning one of the plurality of registers when the malfunctioning one does not respond to the predetermined message.

3. The system according to claim 1, wherein the redundant entity is configured without any subscriber information.

4. The system according to claim 1, wherein the each of plurality of registers is configured to communicate with at least one subscriber entity.

5. The system according to claim 1, wherein the system comprises a database interface configured to communicate with at least one external database.

6. The system according to claim 1, wherein the service routing register is configured to perform load sharing among the plurality of registers when one of the plurality of registers malfunctions.

7. The system according to claim 1, wherein the service routing register is configured to test the plurality of registers, wherein the service routing register uses test subscribers in the plurality of registers to determine which of the plurality of registers is a malfunctioning entity.

8. The system according to claim 1, wherein at least one of the plurality of registers comprises at least one database unit, wherein the service routing register is configured to use a predetermined value configured to determine a minimum number of the database units in one of the plurality of registers that are required to be simultaneously dysfunctional for the service routing register to select another one of the plurality of registers as a redundant entity.

9. A method for managing redundancy, the method comprising:
creating at least one register redundancy server being dedicated to at least one of a plurality of registers, the at least one register redundancy server comprising data from databases associated with the plurality of registers;
determining when one of the plurality of registers malfunctions;
selecting another one of the plurality of registers as a redundant entity, wherein the at least one register redundancy server is associated with the redundant entity; and
retrieving data from the at least one register redundancy server to process incoming requests to the redundant entity.

10. The method according to claim 9, wherein the determining when one of the plurality of registers malfunctions further comprising:
supervising and controlling the plurality of registers by sending a predetermined message to at least one unit in each of the plurality of registers; and
determining a malfunctioning one of the plurality of registers when the malfunctioning one does not respond to the predetermined message.

11. The method according to claim 9, further comprising enabling each of plurality of registers to communicate with at least one subscriber entity.

12. The method according to claim 9, wherein the selecting further comprises performing load sharing among the plurality of registers when one of the plurality of registers malfunctions.

13. The method according to claim 9, wherein prior to the determining when one of the plurality of registers malfunctions, the method further comprises testing each of the plurality of registers, wherein test subscribers are polled in each of the plurality of registers to determine which of the plurality of registers is a malfunctioning entity.

14. An apparatus for managing redundancy, the apparatus comprising:
configuring means for configuring at least one register redundancy server being dedicated to at least one of a plurality of registers, the at least one register redundancy server comprising data from databases associated with the plurality of registers;
determining means for determining when one of the plurality of registers malfunctions;
selecting means for selecting another one of the plurality of registers as a redundant entity, wherein the at least one register redundancy server is associated with the redundant entity; and
retrieving means for retrieving data from the at least one register redundancy server to process incoming requests to the redundant entity.

15. The apparatus according to claim 14, wherein the determining means further comprises:
supervising and controlling means for supervising and controlling the plurality of registers by sending a predetermined message to at least one unit in each of the plurality of registers; and
determining means for determining a malfunctioning one of the plurality of registers when the malfunctioning one does not respond to the predetermined message.

16. The apparatus according to claim 14, wherein the determining means further comprises testing means for testing each of the plurality of registers, wherein test subscribers in each of the plurality of registers are polled to determine which of the plurality of registers is a malfunctioning entity.

17. A service routing register configured to determine when one of a plurality of registers malfunctions and configured to selecting another one of the plurality of registers as a redundant entity, wherein each of the plurality of registers comprising at least one database, and
wherein at least one register redundancy server being dedicated to at least one of the plurality of registers, the at least one register redundancy server comprising data from databases associated with the plurality of registers, and wherein the at least one register redundancy server is associated with the redundant entity and data is retrieved from the at least one register redundancy server to process incoming requests to the redundant entity.

18. The system according to claim 17, wherein the service routing register is configured to supervise and control the plurality of registers by sending a predetermined message to at least one unit in each of the plurality of registers, wherein the service routing register is configured to determine a malfunctioning one of the plurality of registers when the malfunctioning one does not respond to the predetermined message.

* * * * *